United States Patent [19]

Ono et al.

[11] Patent Number: 4,889,837

[45] Date of Patent: Dec. 26, 1989

[54] SEMICONDUCTIVE CERAMIC COMPOSITION

[75] Inventors: Shuichi Ono; Shuichi Itagaki; Masahiro Yahagi, all of Akita, Japan

[73] Assignee: TDK Corporation, Tokyo, Japan

[21] Appl. No.: 88,071

[22] Filed: Aug. 21, 1987

[30] Foreign Application Priority Data

Sep. 2, 1986 [JP] Japan .................. 61-205071
Dec. 26, 1986 [JP] Japan .................. 61-313725

[51] Int. Cl.$^4$ ............................. C04B 35/46
[52] U.S. Cl. .................. 501/139; 501/152; 252/520
[58] Field of Search .............. 501/136, 139, 152; 252/520

[56] References Cited

U.S. PATENT DOCUMENTS

| | | | |
|---|---|---|---|
| 3,069,276 | 12/1962 | Domanski ................ | 501/136 X |
| 3,256,499 | 6/1966 | Khouri ................... | 501/136 X |
| 3,499,772 | 3/1970 | Fujiwara et al. ......... | 501/136 X |
| 3,775,142 | 11/1973 | Roup ..................... | 501/136 X |
| 3,869,398 | 3/1975 | Yamaoka et al. ......... | 501/136 X |
| 4,073,846 | 2/1978 | Masumura et al. ....... | 501/136 X |
| 4,119,554 | 10/1978 | Fujiwara ................ | 501/136 X |
| 4,143,207 | 3/1979 | Itakura et al. .......... | 501/136 X |
| 4,362,637 | 12/1982 | Matsuo et al. .......... | 501/136 X |
| 4,438,214 | 3/1984 | Masuyama et al. ....... | 501/136 |
| 4,482,934 | 11/1984 | Hirota et al. ........... | 501/136 X |
| 4,545,929 | 11/1985 | Masuyama et al. ....... | 501/136 X |
| 4,547,314 | 10/1985 | Masuyama et al. ....... | 501/136 X |
| 4,552,853 | 11/1985 | Kawabata et al. ........ | 501/136 X |

FOREIGN PATENT DOCUMENTS

| | | | |
|---|---|---|---|
| 38044 | 10/1981 | European Pat. Off. ...... | 501/136 |
| 49-59298 | 6/1974 | Japan ..................... | 501/136 |
| 50-27998 | 3/1975 | Japan ..................... | 501/136 |
| 52-61798 | 5/1977 | Japan ..................... | 501/136 |
| 53-25899 | 3/1978 | Japan ..................... | 501/136 |
| 53-58700 | 5/1978 | Japan ..................... | 501/136 |
| 53-68899 | 6/1978 | Japan ..................... | 501/136 |
| 54-50999 | 4/1979 | Japan ..................... | 501/136 |
| 60-216503 | 10/1985 | Japan ..................... | 501/136 |
| 391078 | 7/1973 | U.S.S.R. .................. | 501/136 |
| 460271 | 2/1975 | U.S.S.R. .................. | 501/136 |

OTHER PUBLICATIONS

Cotton, et al. "Advanced In Organic Chemistry", 2nd Ed., John Wiley & Sons, N.Y. (1967) pp. 834–839.

*Primary Examiner*—Brian E. Hearn
*Assistant Examiner*—Andrew Griffis
*Attorney, Agent, or Firm*—Oblon, Spivak, McClelland, Maier & Enustadt

[57] ABSTRACT

A semiconductive ceramic composition for a boundary insulation type semiconductive ceramic capacitor capable of causing the capacitor to exhibit increased dielectric constant, satisfactory frequency and temperature characteristics, and decreased dielectric loss. The composition includes a $SrTiO_3$ base component and a minor component consisting of $CaTiO_3$, $Y_2O_3$ and $Nb_2O_5$. The composition may further contain $MnO$ and $SiO_2$, which contribute to an increase in insulation resistance of the capacitor and enlargement of an appropriate range of a $(SrO+CaO)/TiO_2$, respectively. Also, a composition includes a $SrTiO_3$ base component and a minor component consisting of $CaTiO_3$, $BaTiO_3$, $Y_2O_3$ and $Nb_2O_5$.

3 Claims, No Drawings

SEMICONDUCTIVE CERAMIC COMPOSITION

BACKGROUND OF THE INVENTION

1. Field of the Invention

This invention relates to a semiconductive ceramic composition for a semiconductive ceramic capacitor, and more particularly to a semiconductive ceramic composition suitable for use for manufacture of a boundary insulation type semiconductive ceramic capacitor.

2. Description of the Prior Art

A semiconductive ceramic capacitor serving as a passive electronic circuit element is generally classified into two types, i.e. a boundary-layer type and a surface-layer type. The boundary-layer type semiconductive ceramic capacitor includes a boundary insulation type one and the surface-layer type semiconductive ceramic capacitor includes a barrier-layer type one and a reduction reoxidation type one.

However, it was found that the conventional semiconductive capacitors have the following disadvantages.

The boundary insulation type semiconductive capacitor is relatively decreased in capacity and dielectric strength. The barrier-layer type one is deteriorated in frequency characteristics, increased in dielectric loss (tan δ) and decreased in dielectric strength. The reduction reoxidation type one is deteriorated in frequency characteristics and increased in temperature characteristics and dielectric loss. Such disadvantages are caused due to the fact that a semiconductive ceramic composition which is capable of providing a semiconductive ceramic capacitor free of the above-noted disadvantages is not still developed.

SUMMARY OF THE INVENTION

The present invention has been made in view of the foregoing disadvantages of the prior art.

Accordingly, it is an object of the present invention to provide a semiconductive ceramic composition for a semiconductive ceramic capacitor which is capable of causing the capacitor to exhibit not only increased dielectric constant and satisfactory frequency characteristics and temperature characteristics but decreased dielectric loss.

It is another object of the present invention to provide a semiconductive ceramic composition for a semiconductive ceramic capacitor which is capable of improving insulation resistance of the capacitor.

It is a further object of the present invention to provide a semiconductive ceramic composition for a semiconductive ceramic capacitor which is capable of being readily manufactured while exhibiting the above-described advantages.

It is still another object of the present invention to provide a semiconductive ceramic composition for a boundary insulation type semiconductive ceramic capacitor which is capable of causing the capacitor to exhibit not only increased dielectric constant and satisfactory frequency characteristics and temperature characteristics but decreased dielectric loss.

It is yet another object of the present invention to provide a semiconductive ceramic composition for a boundary insulation type semiconductive ceramic capacitor which is capable of improving insulation resistance of the capacitor.

It is still a further object of the present invention to provide a semiconductive ceramic composition for a boundary insulation type semiconductive ceramic capacitor which is capable of being readily manufactured while exhibiting the above-described advantages.

It is yet a further object of the present invention to provide a semiconductive ceramic composition for a boundary insulation type semiconductive ceramic capacitor which is capable of improving insulation resistance and D.C. breakdown voltage of the capacitor.

In accordance with the present invention, a semiconductive ceramic composition for a semiconductive ceramic capacitor is provided. The composition comprises a $SrTiO_3$ base component and a minor component comprising $CaTiO_3$, Y and Nb. $CaTiO_3$ is present at 0.1 to 2.0 mol% based on the composition, and $Y_2O_3$ and $Nb_2O_5$ are present at 0.1 to 0.4 mol% based on the composition, respectively.

Also, in accordance with the present invention, a semiconductive ceramic composition for a semiconductive ceramic capacitor is provided which comprises a $SrTiO_3$ base component, and a minor component comprising $CaTiO_3$, $BaTiO_3$, $Y_2O_3$ and $Nb_2O_5$. $SrTiO_3$ which constitutes the base component comprises SrO and $TiO_2$ in a molar ratio of 0.970 to 1.000:1.000. $CaTiO_3$ which constitutes a part of the minor component is present in amounts respectively corresponding to 0.1 to 20.0, 1.0 to 20.0, 5.0 to 20.0 and 10.0 to 20.0 mol% in relation to 1.000, 0.990, 0.980 and 0.970 mol which are representative amounts of SrO. $BaTiO_3$ which also constitutes a part of the minor component is present in an amount of 0.05 to 3.0 mol% based on the composition. $Y_2O_3$ and $Nb_2O_5$ which constitute the remaining of the minor component are present in amounts of 0.1 to 1.0 mol% and 0.1 to 0.4 mol% based on the composition, respectively.

DETAILED DESCRIPTION OF THE INVENTION

The present invention is directed to a semiconductive ceramic composition for a semiconductive ceramic capacitor, particularly, a boundary insulation type semiconductive ceramic capacitor which comprises a $SrTiO_3$ base component and a minor component comprising $CaTiO_3$, Y and Nb. The term "minor component" used herein indicates an essential component less in quantity than the base component which is also essential. $CaTiO_3$ which constitutes a part of the minor component is present in an amount of 0.1 to 2.0 mol% based on the composition, and $Y_2O_3$ and $Nb_2O_5$ which constitute the remaining of the minor component are present in amounts of 0.1 to 0.4 mol% based on the composition, respectively.

It was found that use of the composition of such construction for a semiconductive ceramic capacitor, particularly, a boundary insulation type one causes dielectric constant and D.C. breakdown voltage of the capacitor to be significantly increased, resulting in the capacitor being substantially small-sized. For example, such advantages of the present invention permit a diameter of a capacitor element having a capacitor of $10^5$PF picofarads to be decreased from 10 mm to 8 mm. Also, use of the composition significantly improves frequency characteristics, temperature characteristics and dielectric loss of the capacitor. The composition may contain MnO, which may be present in an amount of 0.02 to 0.2 mol% based on the composition. Addition of MnO in such an amount increases insulation resistance of the capacitor. Also, the composition may contain $SiO_2$ in an amount of 0.01 to 0.1 mol%. Such addition of $SiO_2$ substantially enlarges an appropriate range of a (SrO+CaO)/$TiO_2$ ratio to lead to facilitation of manufacturing of the composition and mass production of the composition, resulting in manufacturing costs of the composition and capacitor being effectively decreased.

The present invention is also directed to a semiconductive ceramic composition for a semiconductive ceramic capacitor, particularly, a boundary insulation type semiconductive ceramic capacitor which comprises a $SrTiO_3$ base component, and a minor component comprising $CaTiO_3$, $BaTiO_3$, $Y_2O_3$ and $Nb_2O_5$. $SrTiO_3$ which constitutes the base component comprises SrO and $TiO_2$ in a molar ratio of 0.970 to 1.000:1.000. The relationship between $CaTiO_3$ and SrO falls within the following limits:

0.1 to 20.0 mol% $CaTiO_3$ relative to 1.000 mol SrO,
1.0 to 20.0 mol% $CaTiO_3$ relative to 0.990 mol SrO,
5.0 to 20.0 mol% $CaTiO_3$ relative to 0.980 mol SrO, and
10.0 to 20.0 mol% $CaTiO_3$ relative to 0.970 mol SrO.

$BaTiO_3$ which also constitutes a part of the minor component is present in an amount of 0.05 to 3.0 mol% based on the composition. $Y_2O_3$ and $Nb_2O_5$ which constitute the remaining of the minor component are present in amounts of 0.1 to 1.0 mol% and 0.1 to 0.4 mol% bases based on the composition, respectively.

Use of the so-formulated composition for a semiconductive ceramic capacitor, particularly, a boundary layer type one likewise causes the capacitor to be not only increased in dielectric constant capacity and decreased in dielectric loss but increased in insulation resistance and D.C. breakdown voltage, so that the capacitor likewise may be small-sized. Also, the composition permits an appropriate range of a SrO/$TiO_2$ ratio to be enlarged to a degree sufficient to lead to facilitation of manufacturing of the composition and mass production of the composition, resulting in manufacturing costs of the composition and capacitor being lowered. The composition may include Mn and $SiO_2$. Mn may be present at 0.02 to 0.20 mol% on a MnO base based on the composition and $SiO_2$ may be present at 0.01 to 0.6 mol% based on the composition. Such addition of both MnO and $SiO_2$ to the composition further improves insulation resistance and D.C. breakdown voltage of the capacitor.

Each of the so-formulated semiconductive ceramic compositions of the present invention may be compacted into a semiconductive ceramic element and sintered to cause Bi deposited on the element to be present at a grain boundary thereof.

The invention will be understood more readily with reference to the following examples, however, these examples are intended to illustrate the invention and are not to be construed to limit the scope of the invention.

EXAMPLE 1

$SrCO_3$, $CaCO_3$, $TiO_2$, $MnCO_3$, and $SiO_2$ each were used as a starting material. Also, $Y_2O_3$ and $Nb_2O_5$ were uses as an additive for semiconductivity. The materials were weighed so that each composition may be obtained which has a composition ratio as shown in Tables 1 and 2. The materials were subjected to wet blending in a ball mill of synthetic resin in which water and pebbles were placed for 20 hours while stirring, to thereby prepare each composition mixture. Then, the so-obtained mixture was dewatered and dried, and provisionally burned at 1200° C. for 2 hours, wherein rise and fall in temperature of the mixture was carried out at a rate of 200° C./hr. This resulted in a chemical reaction of the mixture. Subsequently, the mixture was powdered and blended for 20 hours by means of a ball mill in which water and pebbles were placed and then dewatered and dried, to which polyvinyl alcohol (PVA) in an amount of 2 wt% was added as an organic binder to carry out granulation and grading to prepare granulated powder of the composition. The powder was then formed into a disc-like compact or semiconductive ceramic element of 10 mm in diameter and 0.5 mm in thickness at compacting pressure of about 3 tons/cm². The element was heat-treated at 800° C. for 1 hour to remove the binder therefrom and then subjected to burning at about 1450° C. for about 2 hours in a stream of a reducing atmosphere ($H_2+N_2$), to thereby be provided with a semiconductive property. This resulted in a semiconductive ceramic element of 8.5 mm in diameter and 0.4 mm in thickness being obtained.

Then, a $Bi_2O_3$-CuO system frit paste was applied in an amount of 3 mg onto both surfaces of the so-obtained semiconductive ceramic element by printing and then subjected to a heat treatment at 1150° C. for 2 hours, resulting in the semiconductive ceramic element being formed at a grain boundary thereof with an insulation layer. Thereafter, a silver paste was applied onto both surfaces of the element by screen printing, which was then baked at about 800° C. to obtain a boundary insulation type semiconductive ceramic capacitor specimen.

A test was then carried out to consider electrical characteristics of each of the so-prepared capacitor specimens. The results were as shown in Tables 1 and 2, wherein dielectric constant and dielectric loss were measured at frequency of 1 kHz and voltage of 1 V, and insulation resistance was measured at a room temperature of 20° C. while applying D.C. voltage of 25 V to the specimen.

TABLE 1

| Specimen No. | Composition Ratio (mol %) | | | | | Electrical Characteristics | | | | |
| | $SrTiO_3$ | $CaTiO_3$ | $Y_2O_3$ | $Nb_2O_3$ | MnO | $\epsilon s$[1] | $\tan\delta$[2] (%) | IR[3] ($M\Omega$) | Eb[4] (V/mm) | $\epsilon s \times Eb$[5] (V/mm) ($\times 10^7$) |
|---|---|---|---|---|---|---|---|---|---|---|
| 1 | 98.9 | 1.0 | 0 | 0.1 | 0 | 48,000 | 0.33 | 3800 | 590 | 2.8 |
| 2 | 98.6 | 1.0 | 0 | 0.4 | 0 | 61,000 | 0.40 | 3700 | 520 | 3.2 |
| 3 | 98.9 | 1.0 | 0.05 | 0.05 | 0 | 47,000 | 0.35 | 5300 | 780 | 3.7 |
| 4 | 98.7 | 1.0 | 0.05 | 0.25 | 0 | 53,000 | 0.43 | 4300 | 500 | 2.7 |
| 5 | 98.45 | 1.0 | 0.05 | 0.50 | 0 | 69,000 | 0.68 | 2500 | 330 | 2.3 |
| 6 | 98.9 | 1.0 | 0.1 | 0 | 0 | 55,000 | 0.34 | 4200 | 570 | 3.1 |
| 7 | 99.8 | 0 | 0.1 | 0.1 | 0 | 75,000 | 0.30 | 4300 | 650 | 4.9 |
| 8 | 99.75 | 0.05 | 0.1 | 0.1 | 0 | 75,000 | 0.30 | 4300 | 660 | 5.0 |
| 9 | 99.8 | 0.10 | 0.1 | 0.1 | 0 | 74,000 | 0.30 | 5000 | 730 | 5.4 |
| 10 | 98.8 | 1.0 | 0.1 | 0.1 | 0 | 72,000 | 0.32 | 6000 | 790 | 5.7 |

TABLE 1-continued

| Specimen No. | Composition Ratio (mol %) | | | | | Electrical Characteristics | | | | |
|---|---|---|---|---|---|---|---|---|---|---|
| | SrTiO$_3$ | CaTiO$_3$ | Y$_2$O$_3$ | Nb$_2$O$_3$ | MnO | $\epsilon s$*1 | tan$\delta$*2 (%) | IR*3 (M$\Omega$) | Eb*4 (V/mm) | $\epsilon s \times $Eb*5 (V/mm) ($\times 10^7$) |
| 11 | 97.8 | 2.0 | 0.1 | 0.1 | 0 | 71,000 | 0.33 | 7000 | 820 | 5.8 |
| 12 | 96.8 | 3.0 | 0.1 | 0.1 | 0 | 57,000 | 0.42 | 9000 | 1000 | 5.7 |
| 13 | 98.65 | 1.0 | 0.1 | 0.25 | 0 | 86,000 | 0.35 | 5300 | 680 | 5.8 |
| 14 | 99.5 | 0 | 0.1 | 0.4 | 0 | 85,000 | 0.40 | 4300 | 480 | 4.1 |
| 15 | 99.45 | 0.05 | 0.1 | 0.4 | 0 | 85,000 | 0.40 | 4400 | 490 | 4.2 |
| 16 | 99.6 | 0.10 | 0.1 | 0.4 | 0 | 85,000 | 0.40 | 4700 | 600 | 5.1 |
| 17 | 98.5 | 1.0 | 0.1 | 0.4 | 0 | 83,000 | 0.41 | 5700 | 700 | 5.8 |
| 18 | 97.5 | 2.0 | 0.1 | 0.4 | 0 | 79,000 | 0.45 | 6200 | 780 | 6.2 |
| 19 | 96.5 | 3.0 | 0.1 | 0.4 | 0 | 55,000 | 0.52 | 8000 | 870 | 4.8 |
| 20 | 98.75 | 1.0 | 0.25 | 0 | 0 | 48,000 | 0.40 | 4200 | 720 | 3.5 |
| 21 | 98.7 | 1.0 | 0.25 | 0.05 | 0 | 59,000 | 0.34 | 4000 | 700 | 4.1 |
| 22 | 98.65 | 1.0 | 0.25 | 0.10 | 0 | 80,000 | 0.32 | 3800 | 710 | 5.7 |
| 23 | 98.5 | 1.0 | 0.25 | 0.25 | 0 | 116,000 | 0.37 | 4000 | 610 | 7.1 |
| 24 | 98.35 | 1.0 | 0.25 | 0.40 | 0 | 102,000 | 0.38 | 4200 | 610 | 6.2 |
| 25 | 98.25 | 1.0 | 0.75 | 0.50 | 0 | 96,000 | 0.63 | 3200 | 400 | 3.8 |
| 26 | 98.6 | 1.0 | 4.0 | 0 | 0 | 37,000 | 0.66 | 4600 | 890 | 3.3 |
| 27 | 99.5 | 0 | 0.4 | 0.10 | 0 | 76,000 | 0.38 | 5100 | 670 | 5.1 |
| 28 | 99.45 | 0.05 | 0.4 | 0.10 | 0 | 75,000 | 0.38 | 5300 | 690 | 5.2 |
| 29 | 99.4 | 0.10 | 0.4 | 0.10 | 0 | 74,000 | 0.40 | 6000 | 800 | 5.9 |
| 30 | 98.5 | 1.0 | 0.4 | 0.10 | 0 | 72,000 | 0.40 | 7000 | 960 | 6.9 |
| 31 | 97.5 | 2.0 | 0.4 | 0.10 | 0 | 70,000 | 0.42 | 7500 | 1000 | 7.0 |
| 32 | 96.5 | 3.0 | 0.4 | 0.10 | 0 | 52,000 | 0.48 | 10000 | 1030 | 5.4 |
| 33 | 98.35 | 1.0 | 0.4 | 0.25 | 0 | 103,000 | 0.35 | 4600 | 710 | 7.3 |
| 34 | 99.2 | 0 | 0.4 | 0.40 | 0 | 112,000 | 0.36 | 3600 | 580 | 6.5 |
| 35 | 99.15 | 0.05 | 0.4 | 0.40 | 0 | 111,000 | 0.36 | 3600 | 590 | 6.5 |
| 36 | 99.1 | 0.10 | 0.4 | 0.40 | 0 | 110,000 | 0.36 | 4100 | 650 | 7.2 |
| 37 | 98.2 | 1.0 | 0.4 | 0.40 | 0 | 105,000 | 0.38 | 5000 | 710 | 7.5 |
| 38 | 97.2 | 2.0 | 0.4 | 0.40 | 0 | 98,000 | 0.41 | 6500 | 880 | 8.6 |
| 39 | 96.2 | 3.0 | 0.4 | 0.40 | 0 | 67,000 | 0.56 | 9300 | 1010 | 6.8 |
| 40 | 98.45 | 1.0 | 0.5 | 0.05 | 0 | 29,000 | 1.05 | 8100 | 1100 | 3.2 |
| 41 | 98.25 | 1.0 | 0.5 | 0.25 | 0 | 45,000 | 1.00 | 6800 | 740 | 3.3 |
| 42 | 98.0 | 1.0 | 0.5 | 0.50 | 0 | 56,000 | 0.96 | 4100 | 410 | 2.3 |
| 43 | 98.49 | 1.0 | 0.25 | 0.25 | 0.01 | 113,000 | 0.44 | 4200 | 620 | 7.0 |
| 44 | 98.48 | 1.0 | 0.25 | 0.25 | 0.02 | 107,000 | 0.46 | 6000 | 750 | 8.0 |
| 45 | 98.45 | 1.0 | 0.25 | 0.25 | 0.05 | 102,000 | 0.49 | 7100 | 790 | 8.1 |
| 46 | 98.4 | 1.0 | 0.25 | 0.25 | 0.10 | 95,000 | 0.55 | 7800 | 820 | 7.8 |
| 47 | 98.3 | 1.0 | 0.25 | 0.25 | 0.20 | 82,000 | 0.71 | 8200 | 880 | 7.2 |
| 48 | 98.2 | 1.0 | 0.25 | 0.25 | 0.30 | 58,000 | 1.30 | 4500 | 930 | 5.4 |

*1 Dielectric constant
*2 Dielectric loss
*3 Insulation resistance
*4 D.C. breakdown voltage
*5 Product of dielectric constant and D.C. breakdown voltage

TABLE 2

| Specimen No. | Composition Ratio (mol %) | | | | | | $\dfrac{SiO_2 + CaO}{TiO_2}$ | Electrical Characteristics | | | | |
|---|---|---|---|---|---|---|---|---|---|---|---|---|
| | SrTiO$_3$ | CaTiO$_3$ | Y$_2$O$_3$ | Nb$_2$O$_3$ | MnO | SiO$_2$ | | $\epsilon s$*1 | tan$\delta$*2 (%) | IR*3 (M$\Omega$) | Eb*4 (V/mm) | $\epsilon s \times $Eb*5 (V/mm) ($\times 10^7$) |
| 49 | 98.445 | 1.0 | 0.25 | 0.25 | 0.05 | 0.005 | 0.998 | 95,000 | 0.65 | 3000 | 350 | 3.3 |
| 50 | 98.445 | 1.0 | 0.25 | 0.25 | 0.05 | 0.005 | 0.999 | 102,000 | 0.60 | 7500 | 720 | 7.3 |
| 51 | 98.445 | 1.0 | 0.25 | 0.50 | 0.05 | 0.005 | 1.001 | 110,000 | 0.58 | 7200 | 690 | 7.6 |
| 52 | 98.445 | 1.0 | 0.25 | 0.25 | 0.05 | 0.005 | 1.002 | 33,000 | 1.45 | 7500 | 1000 | 3.3 |
| 53 | 98.44 | 1.0 | 0.25 | 0.25 | 0.05 | 0.01 | 0.997 | 100,000 | 0.60 | 3300 | 370 | 3.7 |
| 54 | 98.44 | 1.0 | 0.25 | 0.25 | 0.05 | 0.01 | 0.998 | 105,000 | 0.48 | 7000 | 750 | 7.9 |
| 55 | 98.44 | 1.0 | 0.25 | 0.25 | 0.05 | 0.01 | 1.002 | 106,000 | 0.43 | 7500 | 780 | 8.3 |
| 56 | 98.44 | 1.0 | 0.25 | 0.25 | 0.05 | 0.01 | 1.003 | 48,000 | 1.38 | 7700 | 1020 | 4.9 |
| 57 | 98.40 | 1.0 | 0.25 | 0.25 | 0.05 | 0.05 | 0.996 | 89,000 | 0.55 | 2200 | 320 | 2.8 |
| 58 | 98.40 | 1.0 | 0.25 | 0.25 | 0.05 | 0.05 | 0.997 | 105,000 | 0.42 | 7700 | 730 | 7.7 |
| 59 | 98.40 | 1.0 | 0.25 | 0.25 | 0.05 | 0.05 | 1.003 | 105,000 | 0.42 | 7500 | 860 | 9.0 |
| 60 | 98.40 | 1.0 | 0.25 | 0.25 | 0.05 | 0.05 | 1.004 | 41,000 | 1.51 | 7300 | 990 | 4.1 |
| 61 | 98.35 | 1.0 | 0.25 | 0.25 | 0.05 | 0.10 | 0.996 | 78,000 | 0.55 | 3700 | 380 | 3.0 |
| 62 | 98.35 | 1.0 | 0.25 | 0.25 | 0.05 | 0.10 | 0.997 | 95,000 | 0.50 | 7500 | 890 | 8.5 |
| 63 | 98.35 | 1.0 | 0.25 | 0.25 | 0.05 | 0.10 | 1.003 | 94,000 | 0.43 | 8200 | 930 | 8.7 |
| 64 | 98.35 | 1.0 | 0.25 | 0.25 | 0.05 | 0.10 | 1.004 | 32,000 | 1.37 | 8500 | 1150 | 3.7 |
| 65 | 98.25 | 1.0 | 0.25 | 0.25 | 0.05 | 0.20 | 0.998 | 38,000 | 0.50 | 10000 | 1190 | 4.5 |
| 66 | 98.25 | 1.0 | 0.25 | 0.25 | 0.05 | 0.20 | 1.002 | 35,000 | 0.44 | 11000 | 1100 | 3.9 |

*1 Dielectric constant
*2 Dielectric loss
*3 Insulation resistance
*4 D.C. breakdown voltage
*5 Product of dielectric constant and D.C. breakdown voltage As can be seen from Tables 1 and 2, specimens included in the scope of the present invention each exhibited dielectric constant increased to about 70,000 or more, dielectric loss decreased to a degree as low as 0.30 to 0.71%, and high insulation resistance.

More particularly, Table 1 indicates that addition of only any one of Y ($Y_2O_3$) and Nb ($Nb_2O_5$) failed to provide a boundary insulation type semiconductive ceramic capacitor which is increased in dielectric constant (Specimen Nos. 1, 2, 6, 20 and 26). Also, addition of both $Y_2O_3$ and $Nb_2O_5$ each in an amount below 0.1 mol% failed to significantly increase dielectric constant and D.C. breakdown voltage of the capacitor (Specimen Nos. 3, 4, 5, 21 and 40). $Y_2O_3$ in an amount above 0.4 mol% caused the capacitor to exhibit decreased dielectric constant (Specimen Nos. 40, 41 and 42). $Nb_2O_5$ above 0.4 mol% disadvantageously decreased D.C. breakdown voltage of the capacitor (Specimen Nos. 5, 25 and 42).

When the composition contained $CaTiO_3$ in an amount below 0.1 mol%, insulation resistance of the boundary insulation type semiconductive ceramic capacitor was not significantly increased; whereas the amount of $CaTiO_3$ exceeding 2.0 mol% led to a decrease in dielectric constant (Specimen Nos. 7, 8, 12, 14, 15, 19, 27, 28, 32, 34, 35 and 39).

Further, Table 1 indicates that addition of MnO in an amount below 0.02 mol% failed in a significant increase in insulation resistance of the boundary insulation type semiconductive ceramic capacitor, whereas the addition above 0.2 mol% caused an increase in dielectric loss and a decrease in dielectric constant (Specimen Nos. 23, 43 and 48).

Table 2 indicates that addition of $SiO_2$ in an amount below 0.01 mol% narrowed an appropriate range of a $(SrO+CaO)/TiO_2$ ratio (0.002) (Specimen Nos. 50 and 51), whereas the amount of $SiO_2$ above 0.1 mol% caused a decrease in dielectric constant of the capacitor (Specimen Nos. 65 and 66). Addition of $SiO_2$ in an amount between 0.01 mol% and 0.1 mol% significantly enlarged a $(SrO+CaO)/TiO_2$ ratio (0.004, 0.006) (Specimen Nos. 54, 55, 58, 59, 62 and 63).

EXAMPLE 2

Example 1 was substantially repeated except that $SrCO_3$, $CaCO_3$, $BaCO_3$, $TiO_2$, $MnCO_3$ and $SiO_2$ in such amounts as shown in Tables 3 and 4 were used as a starting material.

The results were as shown in Tables 3 and 4.

TABLE 3

| Specimen No.[1] | SrO (mol) | TiO$_2$ (mol) | Composition Ratio (mol %) | | | | | Electrical Characteristics | | | | |
|---|---|---|---|---|---|---|---|---|---|---|---|---|
| | | | SrTiO$_3$ | CaTiO$_3$ | BaTiO$_3$ | Y$_2$O$_3$ | Nb$_2$O$_3$ | $\varepsilon_s$[2] | tan δ[3] (%) | IR[4] (MΩ) (× 10$^3$) | Eb[5] (V/mm) | $\varepsilon_s$ × Eb[6] (V/mm) (× 10$^7$) |
| 1 | 1.005 | 1.000 | 98.50 | 0.10 | 1.0 | 0.2 | 0.2 | 40,000 | 0.8 | 7 | 1,000 | 4.0 |
| 2 | 1.005 | 1.000 | 93.60 | 5.0 | 1.0 | 0.2 | 0.2 | 25,000 | 0.8 | 10 | 1,300 | 3.3 |
| 3 | 1.000 | 1.000 | 78.60 | 20.0 | 1.0 | 0.2 | 0.2 | 12,000 | 1.0 | 15 | 1,900 | 2.3 |
| 4 | 1.000 | 1.000 | 98.60 | 0 | 1.0 | 0.2 | 0.2 | 98,000 | 0.4 | 1 | 370 | 3.6 |
| 5 | 1.000 | 1.000 | 98.55 | 0.05 | 1.0 | 0.2 | 0.2 | 80,000 | 0.4 | 2 | 500 | 4.0 |
| ⑥ | 1.000 | 1.000 | 98.50 | 0.10 | 1.0 | 0.2 | 0.2 | 77,000 | 0.4 | 8 | 710 | 5.5 |
| ⑦ | 1.000 | 1.000 | 93.60 | 5.0 | 1.0 | 0.2 | 0.2 | 71,000 | 0.4 | 10 | 920 | 6.5 |
| ⑧ | 1.000 | 1.000 | 78.60 | 20.0 | 1.0 | 0.2 | 0.2 | 53,000 | 0.5 | 20 | 1,400 | 7.4 |
| 9 | 1.000 | 1.000 | 68.60 | 30.0 | 1.0 | 0.2 | 0.2 | 34,000 | 1.8 | 30 | 1,700 | 5.8 |
| 10 | 0.990 | 1.000 | 98.50 | 0.10 | 1.0 | 0.2 | 0.2 | 102,000 | 0.3 | 1 | 500 | 5.1 |
| ⑪ | 0.990 | 1.000 | 97.60 | 1.0 | 1.0 | 0.2 | 0.2 | 81,000 | 0.4 | 7 | 900 | 7.3 |
| ⑫ | 0.990 | 1.000 | 93.60 | 5.0 | 1.0 | 0.2 | 0.2 | 76,000 | 0.4 | 8 | 1,100 | 8.4 |
| ⑬ | 0.990 | 1.000 | 78.60 | 20.0 | 1.0 | 0.2 | 0.2 | 55,000 | 0.5 | 10 | 1,600 | 8.8 |
| 14 | 0.980 | 1.000 | 97.60 | 1.0 | 1.0 | 0.2 | 0.2 | 98,000 | 0.4 | 0.8 | 370 | 3.6 |
| ⑮ | 0.980 | 1.000 | 93.60 | 5.0 | 1.0 | 0.2 | 0.2 | 78,000 | 0.4 | 8 | 750 | 5.9 |
| ⑯ | 0.980 | 1.000 | 78.60 | 20.0 | 1.0 | 0.2 | 0.2 | 56,000 | 0.6 | 10 | 1,000 | 5.6 |
| 17 | 0.970 | 1.000 | 93.60 | 5.0 | 1.0 | 0.2 | 0.2 | 90,000 | 0.4 | 0.7 | 280 | 2.5 |
| ⑱ | 0.970 | 1.000 | 88.60 | 10.0 | 1.0 | 0.2 | 0.2 | 70,000 | 0.4 | 9 | 660 | 4.6 |
| ⑲ | 0.970 | 1.000 | 78.60 | 20.0 | 1.0 | 0.2 | 0.2 | 57,000 | 0.4 | 10 | 960 | 5.5 |
| 20 | 0.970 | 1.000 | 68.60 | 30.0 | 1.0 | 0.2 | 0.2 | 36,000 | 1.3 | 20 | 1,200 | 4.3 |
| 21 | 0.965 | 1.000 | 88.60 | 10.0 | 1.0 | 0.2 | 0.2 | 85,000 | 0.5 | 0.2 | 310 | 2.6 |
| 22 | 0.965 | 1.000 | 78.60 | 20.0 | 1.0 | 0.2 | 0.2 | 70,000 | 0.5 | 0.5 | 420 | 2.9 |
| 23 | 0.990 | 1.000 | 94.60 | 5.0 | 0 | 0.2 | 0.2 | 103,000 | 0.4 | 1 | 360 | 3.7 |
| ㉔ | 0.990 | 1.000 | 94.55 | 5.0 | 0.05 | 0.2 | 0.2 | 87,000 | 0.4 | 7 | 700 | 6.1 |
| ㉕ | 0.990 | 1.000 | 94.50 | 5.0 | 0.10 | 0.2 | 0.2 | 81,000 | 0.4 | 9 | 830 | 6.7 |
| ㉖ | 0.990 | 1.000 | 92.60 | 5.0 | 2.0 | 0.2 | 0.2 | 68,000 | 0.5 | 10 | 1,300 | 8.8 |
| ㉗ | 0.990 | 1.000 | 91.60 | 5.0 | 3.0 | 0.2 | 0.2 | 57,000 | 0.7 | 12 | 1,500 | 8.6 |
| 28 | 0.990 | 1.000 | 90.60 | 5.0 | 4.0 | 0.2 | 0.2 | 38,000 | 1.4 | 15 | 1,700 | 6.5 |
| 29 | 0.990 | 1.000 | 93.90 | 5.0 | 1.0 | 0 | 0.10 | 35,000 | 0.6 | 2 | 610 | 2.1 |
| 30 | 0.990 | 1.000 | 93.85 | 5.0 | 1.0 | 0.05 | 0.10 | 37,000 | 0.6 | 3 | 670 | 2.5 |
| 31 | 0.990 | 1.000 | 93.55 | 5.0 | 1.0 | 0.05 | 0.40 | 40,000 | 0.6 | 5 | 720 | 2.9 |
| 32 | 0.990 | 1.000 | 93.85 | 5.0 | 1.0 | 0.10 | 0.05 | 36,000 | 0.6 | 8 | 550 | 2.0 |
| ㉝ | 0.990 | 1.000 | 93.80 | 5.0 | 1.0 | 0.10 | 0.10 | 52,000 | 0.5 | 9 | 710 | 3.7 |
| ㉞ | 0.990 | 1.000 | 93.50 | 5.0 | 1.0 | 0.10 | 0.40 | 57,000 | 0.5 | 10 | 760 | 4.3 |
| 35 | 0.990 | 1.000 | 93.40 | 5.0 | 1.0 | 0.10 | 0.50 | 38,000 | 0.5 | 12 | 800 | 3.0 |
| 36 | 0.990 | 1.000 | 93.80 | 5.0 | 1.0 | 0.20 | 0 | 34,000 | 0.5 | 3 | 600 | 2.0 |
| ㉗ | 0.990 | 1.000 | 93.70 | 5.0 | 1.0 | 0.20 | 0.10 | 60,000 | 0.4 | 9 | 580 | 3.5 |
| ㊳ | 0.990 | 1.000 | 93.40 | 5.0 | 1.0 | 0.20 | 0.40 | 81,000 | 0.4 | 10 | 860 | 7.0 |
| ㊴ | 0.990 | 1.000 | 93.40 | 5.0 | 1.0 | 0.50 | 0.10 | 63,000 | 0.4 | 12 | 700 | 4.4 |
| 40 | 0.990 | 1.000 | 92.95 | 5.0 | 1.0 | 1.0 | 0.05 | 42,000 | 0.4 | 7 | 660 | 2.8 |
| ㊶ | 0.990 | 1.000 | 92.90 | 5.0 | 1.0 | 1.0 | 0.10 | 258,000 | 0.4 | 10 | 830 | 4.8 |
| ㊷ | 0.990 | 1.000 | 92.60 | 5.0 | 1.0 | 1.0 | 0.40 | 61,000 | 0.4 | 12 | 1,050 | 6.4 |
| 43 | 0.990 | 1.000 | 92.50 | 5.0 | 1.0 | 1.0 | 0.50 | 43,000 | 0.6 | 13 | 1,100 | 4.7 |
| 44 | 0.990 | 1.000 | 92.70 | 5.0 | 1.0 | 1.2 | 0.10 | 39,000 | 0.6 | 13 | 1,100 | 4.3 |

TABLE 3-continued

| Specimen No.[*1] | SrO (mol) | TiO$_2$ (mol) | Composition Ratio (mol %) | | | | | $\epsilon s$[*2] | tan δ[*3] (%) | IR[*4] (MΩ) (× 10$^3$) | Eb[*5] (V/mm) | $\epsilon s \times Eb$[*6] (V/mm) (× 10$^7$) |
|---|---|---|---|---|---|---|---|---|---|---|---|---|
| | | | SrTiO$_3$ | CaTiO$_3$ | BaTiO$_3$ | Y$_2$O$_3$ | Nb$_2$O$_3$ | | | | | |
| 45 | 0.990 | 1.000 | 92.40 | 5.0 | 1.0 | 1.2 | 0.40 | 36,000 | 0.6 | 13 | 1,200 | 4.3 |

[*1] A numeral enclosed with a circle indicates a specimen included in the scope of the present invention.
[*2] Dielectric constant
[*3] Dielectric loss
[*4] Insulation resistance
[*5] D.C. breakdown voltage
[*6] Product of dielectric constant and D.C. breakdown voltage

TABLE 4

| Specimen No.[*1] | SrO (mol) | TiO$_2$ (mol) | Composition Ratio (mol %) | | | | | | | $\epsilon s$[*2] | tanδ[*3] (%) | IR[*4] (MΩ) (× 10$^3$) | Eb[*5] (V/mm) | $\epsilon s \times Eb$[*6] (V/mm) (× 10$^7$) |
|---|---|---|---|---|---|---|---|---|---|---|---|---|---|---|
| | | | SrTiO$_3$ | CaTiO$_3$ | BaTiO$_3$ | Y$_2$O$_3$ | Nb$_2$O$_3$ | MnO | SiO$_2$ | | | | | |
| 46 | 0.990 | 1.000 | 93.60 | 5.0 | 1.0 | 0.2 | 0.2 | 0 | 0 | 76,000 | 0.4 | 8 | 1,000 | 8.4 |
| 47 | 0.990 | 1.000 | 93.58 | 5.0 | 1.0 | 0.2 | 0.2 | 0.02 | 0 | 71,000 | 0.4 | 10 | 1,000 | 7.8 |
| 48 | 0.990 | 1.000 | 93.55 | 5.0 | 1.0 | 0.2 | 0.2 | 0.05 | 0 | 69,000 | 0.4 | 10 | 1,200 | 8.3 |
| 49 | 0.990 | 1.000 | 93.40 | 5.0 | 1.0 | 0.2 | 0.2 | 0.20 | 0 | 65,000 | 0.7 | 12 | 1,100 | 7.2 |
| 50 | 0.990 | 1.000 | 93.30 | 5.0 | 1.0 | 0.2 | 0.2 | 0.30 | 0 | 60,000 | 1.6 | 8 | 1,000 | 6.0 |
| 51 | 0.990 | 1.000 | 93.59 | 5.0 | 1.0 | 0.2 | 0.2 | 0 | 0.01 | 73,000 | 0.4 | 9 | 1,200 | 8.8 |
| 52 | 0.990 | 1.000 | 93.00 | 5.0 | 1.0 | 0.2 | 0.2 | 0 | 0.60 | 58,000 | 0.4 | 10 | 1,500 | 8.7 |
| 53 | 0.990 | 1.000 | 92.90 | 5.0 | 1.0 | 0.2 | 0.2 | 0 | 0.70 | 48,000 | 0.5 | 9 | 1,300 | 6.2 |
| (54) | 0.990 | 1.000 | 93.57 | 5.0 | 1.0 | 0.2 | 0.2 | 0.02 | 0.01 | 68,000 | 0.4 | 10 | 1,400 | 9.5 |
| (55) | 0.990 | 1.000 | 92.98 | 5.0 | 1.0 | 0.2 | 0.2 | 0.02 | 0.60 | 56,000 | 0.4 | 15 | 1,800 | 10.1 |
| (56) | 0.990 | 1.000 | 92.88 | 5.0 | 1.0 | 0.2 | 0.2 | 0.02 | 0.70 | 45,000 | 0.4 | 15 | 2,000 | 9.0 |
| (57) | 0.990 | 1.000 | 93.45 | 5.0 | 1.0 | 0.2 | 0.2 | 0.05 | 0.10 | 59,000 | 0.4 | 15 | 1,600 | 9.4 |
| (58) | 0.990 | 1.000 | 93.39 | 5.0 | 1.0 | 0.2 | 0.2 | 0.20 | 0.01 | 61,000 | 0.8 | 15 | 1,300 | 7.9 |
| (59) | 0.990 | 1.000 | 92.80 | 5.0 | 1.0 | 0.2 | 0.2 | 0.20 | 0.60 | 54,000 | 0.8 | 20 | 2,100 | 11.3 |
| 60 | 0.990 | 1.000 | 92.70 | 5.0 | 1.0 | 0.2 | 0.2 | 0.20 | 0.70 | 46,000 | 0.8 | 25 | 2,400 | 11.0 |
| 61 | 0.990 | 1.000 | 93.29 | 5.0 | 1.0 | 0.2 | 0.2 | 0.30 | 0.01 | 57,000 | 1.8 | 10 | 1,300 | 7.4 |
| 62 | 0.990 | 1.000 | 92.70 | 5.0 | 1.0 | 0.2 | 0.2 | 0.30 | 0.60 | 51,000 | 1.7 | 15 | 2,000 | 10.2 |
| 63 | 0.990 | 1.000 | 92.60 | 5.0 | 1.0 | 0.2 | 0.2 | 0.30 | 0.70 | 43,000 | 1.8 | 20 | 1,900 | 8.2 |

[*1] A numeral enclosed with a circle indicates a specimen included in the scope of the present invention.
[*2] Dielectric constant
[*3] Dielectric loss
[*4] Insulation resistance
[*5] D.C. breakdown voltage
[*6] Product of dielectric constant and D.C. breakdown voltage As can be seen from Tables 3 and 4, specimens included in the scope of the present invention each exhibited dielectric constant increased to about 50,000 or more, dielectric loss decreased to 1.0% or less, and high insulation resistance.

More particularly, Table 3 indicates that when the amount of CaTiO$_3$ which constitutes a part of the minor component was below 0.05 mol%, insulation resistance and D.C. breakdown voltage of the boundary insulation type semiconductive ceramic capacitor were disadvantageously decreased (Specimen Nos. 4 and 5), whereas addition of CaTiO$_3$ in an amount between 0.10 mol% and 20.0 mol% significantly enlarged an appropriate range of a SrO/TiO$_2$ ratio (0.030) (Specimen Nos. 6, 7, 8, 11, 12, 13, 15, 16, 18 and 19). However, a combination of CaTiO$_3$ below 0.10 mol% and a SrO/TiO$_2$ ratio of 0.990, that of CaTiO$_3$ below 1.0 mol% and the ratio of 0.980, and that of CaTiO$_3$ below 5.0 mol% and the ratio of 0.970 each decreased insulation resistance and D.C. breakdown voltage of the capacitor (Specimen Nos. 10, 14 and 17). The amount of CaTiO$_3$ exceeding 20.0 mol% led to a decrease in dielectric constant and an increase in dielectric loss (Specimen Nos. 9 and 20).

Addition of BaTiO$_3$ in an amount below 0.05 mol% decreased insulation resistance and D.C. breakdown voltage of the capacitor (Specimen No. 23), whereas the addition above 3.0 mol% caused a decrease in dielectric constant and an increase in dielectric loss (Specimen No. 28).

Table 3 also indicates that addition of only any one of Y (Y$_2$O$_3$) and Nb (Nb$_2$O$_5$) failed to provide a boundary insulation type semiconductive ceramic capacitor which is increased in dielectric constant (Specimen Nos. 29 and 30). Also, addition of both Y$_2$O$_3$ and Nb$_2$O$_5$ each in an amount below 0.1 mol% failed to significantly increase dielectric constant and D.C breakdown voltage of the capacitor (Specimen Nos. 30, 31, 32 and 40). Y$_2$O$_3$ in an amount above 1.0 mol% caused the capacitor to exhibit decreased dielectric constant (Specimen Nos. 44 and 45). Nb$_2$O$_5$ above 0.4 mol% disadvantageously decreased D.C. breakdown voltage of the capacitor (Specimen Nos. 35 and 43).

Table 4 shows results of addition of Mn (MnO) and SiO$_2$, wherein Specimen No. 46 indicates a reference.

Addition of only any one of Mn and SiO$_2$ failed in a significant increase in insulation resistance of the capacitor (Specimen Nos. 47 to 53). Addition both Mn and SiO$_2$ increased dielectric loss of the capacitor when the amount of MnO exceeded 0.2 mol% (Specimen Nos. 61 to 63). SiO$_2$ above 0.6 mol% caused a decrease in dielectric constant (Specimen Nos. 56, 60 and 63).

While the invention has been described with a certain degree of particularity with reference to the examples, obvious modifications and variations are possible in the light of the above teachings. It is therefore to be understood that within the scope of the appended claims, the invention may be practiced otherwise than as specifically described.

What is claimed is:

1. A semiconductive ceramic composition comprising:
   a base component comprising $SrTiO_3$; and
   a minor component comprising $CaTiO_3$, $BaTiO_3$, $Y_2O_3$ and $Nb_2O_5$;
   said $SrTiO_3$ comprising SrO and $TiO_2$ in a molar ratio of 0.970 to 1.000:1.000;
   the relationship between said $CaTiO_3$ and said SrO falls within the following limits
   0.1 to 20.0 mol% $CaTiO_3$ relative to 1.000 mol SrO,
   1.0 to 20.0 mol% $CaTiO_3$ relative to 0.990 mol SrO,
   5.0 to 20.0 mol% $CaTiO_3$ relative to 0.980 mol SrO, and
   10.0 to 20.0 mol% $CaTiO_3$ relative to 0.970 mol SrO;
   said $BaTiO_3$ being present in an amount of 0.05 to 3.0 mol% and said $Y_2O_3$ and $Nb_2O_5$ being present in amounts of 0.1 to 1.0 mol% and 0.1 to 0.4 mol%, respectively.

2. A semiconductive ceramic composition as defined in claim 1 further comprising MnO and $SiO_2$, said MnO being present in an amount of 0.02 to 0.20 mol% based on said composition and said $SiO_2$ being present in an amount of 0.01 to 0.6 mol% based on said composition.

3. A semiconductive ceramic composition as defined in claim 1 or 2, wherein a Bi-containing frit is applied to said composition which is then compacted and sintered to cause Bi to be present at a grain boundary thereof.

* * * * *